United States Patent
Stern et al.

(10) Patent No.: US 11,959,564 B2
(45) Date of Patent: Apr. 16, 2024

(54) VALVE SEAT ASSEMBLY

(71) Applicant: Mueller International, LLC, Atlanta, GA (US)

(72) Inventors: Timothy Wayne Stern, Macon, IL (US); Stephen Adrianus de Boer, Summerland (CA); Fairlyte Paige Eubank, Vancouver, WA (US)

(73) Assignee: Mueller International, LLC, Atlanta, GA (US)

( * ) Notice: Subject to any disclaimer, the term of this patent is extended or adjusted under 35 U.S.C. 154(b) by 0 days.

(21) Appl. No.: 16/887,753

(22) Filed: May 29, 2020

(65) Prior Publication Data

US 2021/0372533 A1  Dec. 2, 2021

(51) Int. Cl.
*F16K 7/17*  (2006.01)
*F16K 15/14* (2006.01)

(52) U.S. Cl.
CPC ............ *F16K 7/17* (2013.01); *F16K 15/144* (2013.01)

(58) Field of Classification Search
CPC ..... F16K 7/12; F16K 7/17; F16K 7/20; F16K 15/144; F16K 15/145; F16K 31/126; F16K 31/1262; F16K 31/1266; F16K 31/365; F16K 31/385; F16K 17/0453; F16K 17/085; G05D 16/063; G05D 16/0633; G05D 16/0636; G05D 16/0641
See application file for complete search history.

(56) References Cited

U.S. PATENT DOCUMENTS

| | | | | |
|---|---|---|---|---|
| 269,886 A * | 1/1883 | Semple | ................. | F16K 31/402 251/46 |
| 3,526,360 A * | 9/1970 | Ray | ................. | F23N 5/047 236/80 R |
| 3,669,143 A * | 6/1972 | Reese | ................. | F16K 31/36 137/512.3 |
| 3,913,884 A * | 10/1975 | Rolfe | ................. | F16K 31/402 251/35 |
| 4,135,696 A * | 1/1979 | Saarem | ................. | F16K 31/402 251/30.02 |
| 4,180,236 A * | 12/1979 | Saarem | ................. | F16K 31/402 251/30.02 |
| 4,226,259 A * | 10/1980 | Szekely | ................. | G05D 16/163 251/30.02 |

(Continued)

FOREIGN PATENT DOCUMENTS

| | | | | | |
|---|---|---|---|---|---|
| FR | 2205980 A6 | * | 5/1974 | ............... | F16K 7/12 |
| FR | 2920165 A1 | * | 2/2009 | ............... | E03B 1/04 |

OTHER PUBLICATIONS

English translation of FR2920165A1 (Year: 2022).*

*Primary Examiner* — Hailey K. Do

(74) *Attorney, Agent, or Firm* — Taylor English Duma LLP

(57) ABSTRACT

Example aspects of a seat assembly for a valve, a valve, and a method for opening a valve are disclosed. The seat assembly for a valve can comprise a diaphragm defining a first diaphragm end and a second diaphragm end, the diaphragm comprising a diaphragm end wall at the second diaphragm end, the diaphragm end wall defining an inner diaphragm end wall surface and an outer diaphragm end wall surface; and a diaphragm guide comprising a guide disc, the guide disc defining an inner guide disc surface and an outer guide disc surface, the outer guide disc surface abutting the inner diaphragm end wall surface.

24 Claims, 10 Drawing Sheets

(56) References Cited

U.S. PATENT DOCUMENTS

| | | | | |
|---|---|---|---|---|
| 4,244,554 A * | 1/1981 | DiMauro | F16K 31/385 | 251/30.02 |
| 4,505,450 A * | 3/1985 | Saarem | F16K 31/402 | 251/30.01 |
| 4,517,803 A * | 5/1985 | Jamison | F02B 37/16 | 137/859 |
| 4,671,485 A * | 6/1987 | Saarem | F16K 31/404 | 251/24 |
| 4,715,578 A * | 12/1987 | Seltzer | F16K 7/17 | 251/25 |
| 4,893,645 A * | 1/1990 | Augustinas | F16K 31/402 | 251/285 |
| 4,911,401 A * | 3/1990 | Holcomb | F16K 31/402 | 251/30.05 |
| 4,967,996 A * | 11/1990 | Sonoda | H01F 7/1615 | 251/30.02 |
| 5,118,072 A * | 6/1992 | Sakamoto | F16K 31/402 | 251/30.02 |
| 5,213,124 A * | 5/1993 | Costa | F16K 31/402 | 251/30.02 |
| 5,464,064 A * | 11/1995 | Weingarten | F16K 7/17 | 169/22 |
| 5,771,924 A * | 6/1998 | Huygen | F16K 17/168 | 251/335.2 |
| 7,475,863 B2 * | 1/2009 | Donovan | F16K 31/402 | 251/285 |
| 8,118,278 B2 * | 2/2012 | Hays | F16K 7/12 | 251/333 |
| 8,235,352 B2 * | 8/2012 | Irwin | F16K 31/402 | 251/30.01 |
| 9,803,755 B2 * | 10/2017 | Weingarten | F16K 7/17 | |
| 2005/0189506 A1 * | 9/2005 | Lee | F16K 31/402 | 251/30.01 |
| 2010/0012868 A1 * | 1/2010 | Lodolo | F16K 31/385 | 251/25 |
| 2011/0006239 A1 * | 1/2011 | Gerlich | F16K 31/1266 | 251/331 |
| 2014/0166130 A1 * | 6/2014 | Jin | F02B 37/16 | 137/488 |
| 2015/0260306 A1 * | 9/2015 | Arnold | F16K 31/1264 | 251/63.6 |
| 2016/0327964 A1 * | 11/2016 | Kiesbauer | F16K 31/1262 | |
| 2017/0146137 A1 * | 5/2017 | Koelzer | B60T 17/004 | |
| 2017/0204980 A1 * | 7/2017 | Naor | F16K 11/22 | |
| 2020/0056633 A1 * | 2/2020 | Weingarten | F15B 11/028 | |

\* cited by examiner

VALVE SEAT ASSEMBLY

TECHNICAL FIELD

This disclosure relates to valves. More specifically, this disclosure relates to a seat assembly for a valve, the seat assembly configurable in an open orientation and a closed orientation.

BACKGROUND

Valves often comprise a diaphragm movable between an open orientation and a closed orientation for opening and closing the valve. Typically, the diaphragm is pressurized on one side only. Furthermore, some valves comprise a guide for guiding the diaphragm between the open and closed orientations. Often, the guide is configured to penetrate the diaphragm. For example, some guides comprise a piece of metal (e.g., a metal disc) sandwiched within the material of the diaphragm, which can aid in sealing the diaphragm with the valve body. However, sandwiching the metal within the diaphragm can be a costly manufacturing process.

SUMMARY

It is to be understood that this summary is not an extensive overview of the disclosure. This summary is exemplary and not restrictive, and it is intended neither to identify key or critical elements of the disclosure nor delineate the scope thereof. The sole purpose of this summary is to explain and exemplify certain concepts of the disclosure as an introduction to the following complete and extensive detailed description.

Disclosed is a seat assembly for a valve, the seat assembly comprising a diaphragm defining a first diaphragm end and a second diaphragm end, the diaphragm comprising a diaphragm end wall at the second diaphragm end, the diaphragm end wall defining an inner diaphragm end wall surface and an outer diaphragm end wall surface; and a diaphragm guide comprising a guide disc, the guide disc defining an inner guide disc surface and an outer guide disc surface, the outer guide disc surface abutting the inner diaphragm end wall surface.

Also disclosed is a valve comprising a valve body defining an inlet cavity region and an outlet cavity region; a bonnet coupled to valve body; and a seat assembly configured to move between an open orientation and a closed orientation, the seat assembly comprising a diaphragm and a diaphragm guide, the diaphragm guide defining a guide disc and the diaphragm defining a diaphragm end wall, the guide disc abutting the diaphragm end wall; wherein, in the open orientation, fluid is permitted to flow between the inlet and outlet cavity regions, and in the closed orientation, fluid is prohibited from flowing between the inlet and outlet cavity regions.

Also disclosed is a method for opening a valve comprising providing the valve, the valve comprising an inlet cavity region, an outlet cavity region, an upper chamber, and a seat assembly separating the upper chamber from the inlet and outlet cavity regions, the seat assembly comprising a guide piston and a diaphragm, the guide piston comprising a guide disc abutting the diaphragm; decreasing the pressure in the upper chamber; sliding a guide stem of the guide piston within a bonnet bore of the valve; and disengaging a diaphragm sealing surface of the diaphragm from a valve body sealing surface of the valve to allow fluid flow from the inlet cavity region to the outlet cavity region.

A valve is also disclosed, the valve comprising a valve body defining an inlet cavity region and an outlet cavity region; a bonnet coupled to valve body and defining an upper chamber; a seat assembly movable between an open orientation and a closed orientation and defining an equalization pathway extending from the inlet cavity region to the upper chamber; a depressurization pathway extending from the upper chamber to the outlet cavity region; and a solenoid system comprising a plunger, the plunger movable between a closed position, wherein the depressurization pathway is sealed, and an open position, wherein the depressurization pathway is unsealed.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

DETAILED DESCRIPTION

Figure 1:
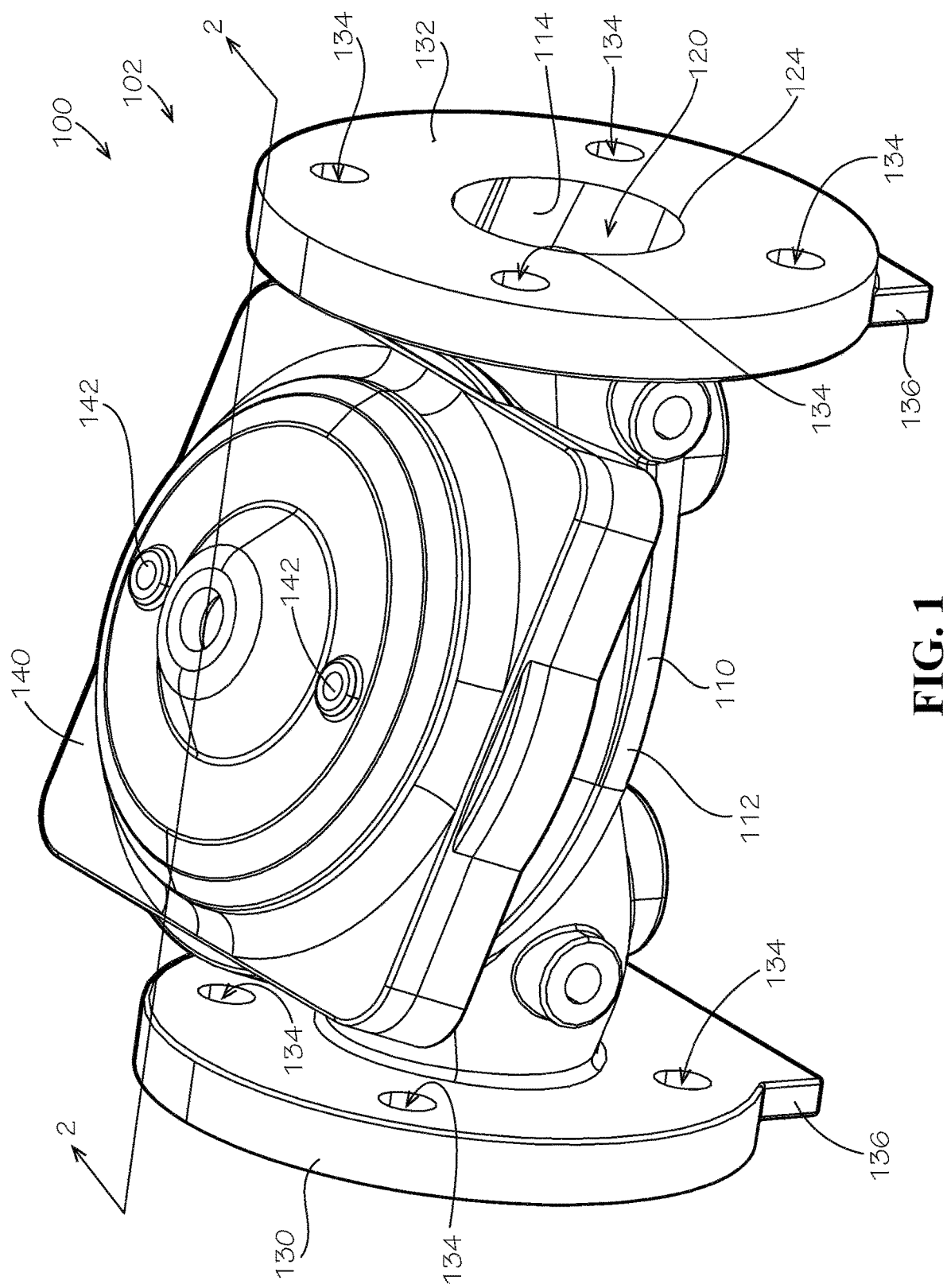
FIG. 1 is a top perspective view of a deluge valve in a closed orientation, in accordance with one aspect of the present disclosure.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutations of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

Disclosed in the present application is a deluge valve and associated methods, systems, devices, and various apparatus. Example aspects of the deluge valve can comprise a valve body defining a cavity and a seat assembly received in the cavity. The seat assembly can comprise a diaphragm and a diaphragm guide engaged with the diaphragm. It would be understood by one of skill in the art that the disclosed deluge valve is described in but a few exemplary aspects among many. No particular terminology or description should be considered limiting on the disclosure or the scope of any claims issuing therefrom.

FIG. 1 illustrates a top perspective view of a valve, according to the present disclosure. The valve can be, for example, a deluge valve 100. In other aspects, the valve can be any other suitable type of valve known in the art. As shown, the deluge valve 100 can comprise a valve body 110 and a bonnet 140 that can be removably secured to the valve body 110. According to example aspects, the bonnet 140 can be secured to the valve body 110 by one or more fasteners (not shown), including but not limited to welding, screws, nut and bolt assemblies, adhesives, and the like. In other aspects, the bonnet 140 may be fixedly secured to the valve body 110. In some example aspects, the bonnet 140 can comprise one or more bonnet plugs 142 engaging a corresponding bonnet plug bore 1050 (shown in FIG. 10) formed therethrough. The valve body 110 can generally define an outer valve body surface 112 and an inner valve body surface 114. The inner valve body surface 114 can define a valve body cavity 120. Example aspects of the valve body cavity 120 can define an inlet end 222 (shown in FIG. 2A), an opposite outlet end 124, and a central region 226 (shown in FIG. 2A) disposed therebetween. Moreover, example aspects of the valve body 110 can comprise an inlet flange 130 oriented at the inlet end 222 of the valve body cavity 120 and an outlet flange 132 oriented at the outlet end 124 of the valve body cavity 120. The valve body 110 and bonnet 140 can be formed from a metal material such as, for example, a cast iron material, and more specifically, in some example aspects, ductile iron. However, other example aspects of the valve body 110 can be formed from any other suitable metal material, including, but not limited to, steel, carbon, bronze, or another iron material, or can be formed from a non-metal material, such as, for example, plastic or any other suitable non-metal material known in the art.

Figure 9:
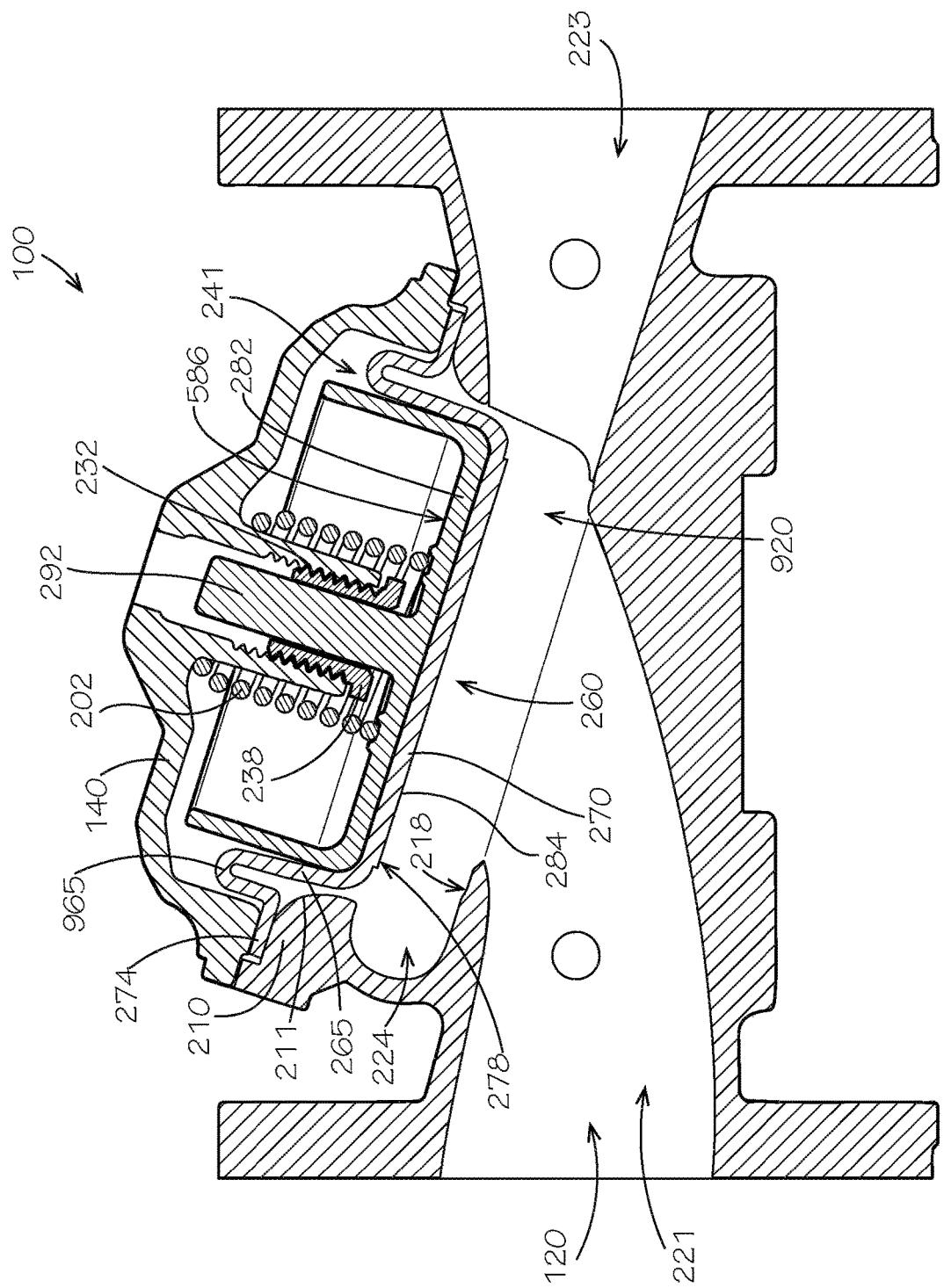
FIG. 9 is a cross-sectional view of the deluge valve of FIG. 1 taken along line 2-2 in FIG. 1, illustrating the seat assembly of FIG. 2A in an open orientation.
Figure 10:
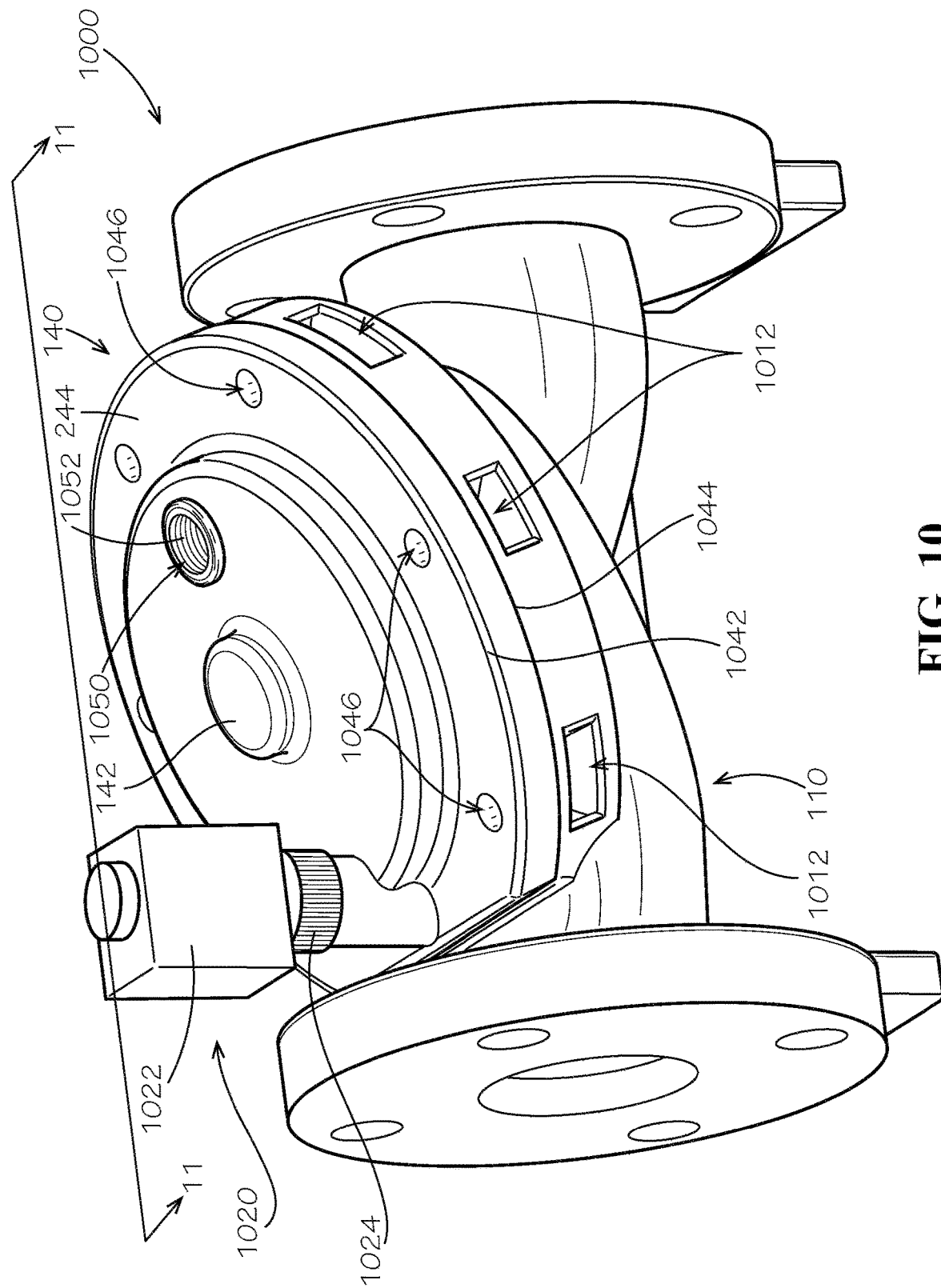
FIG. 10 is a top perspective view of an irrigation valve according to another aspect of the present disclosure.
Figure 11:
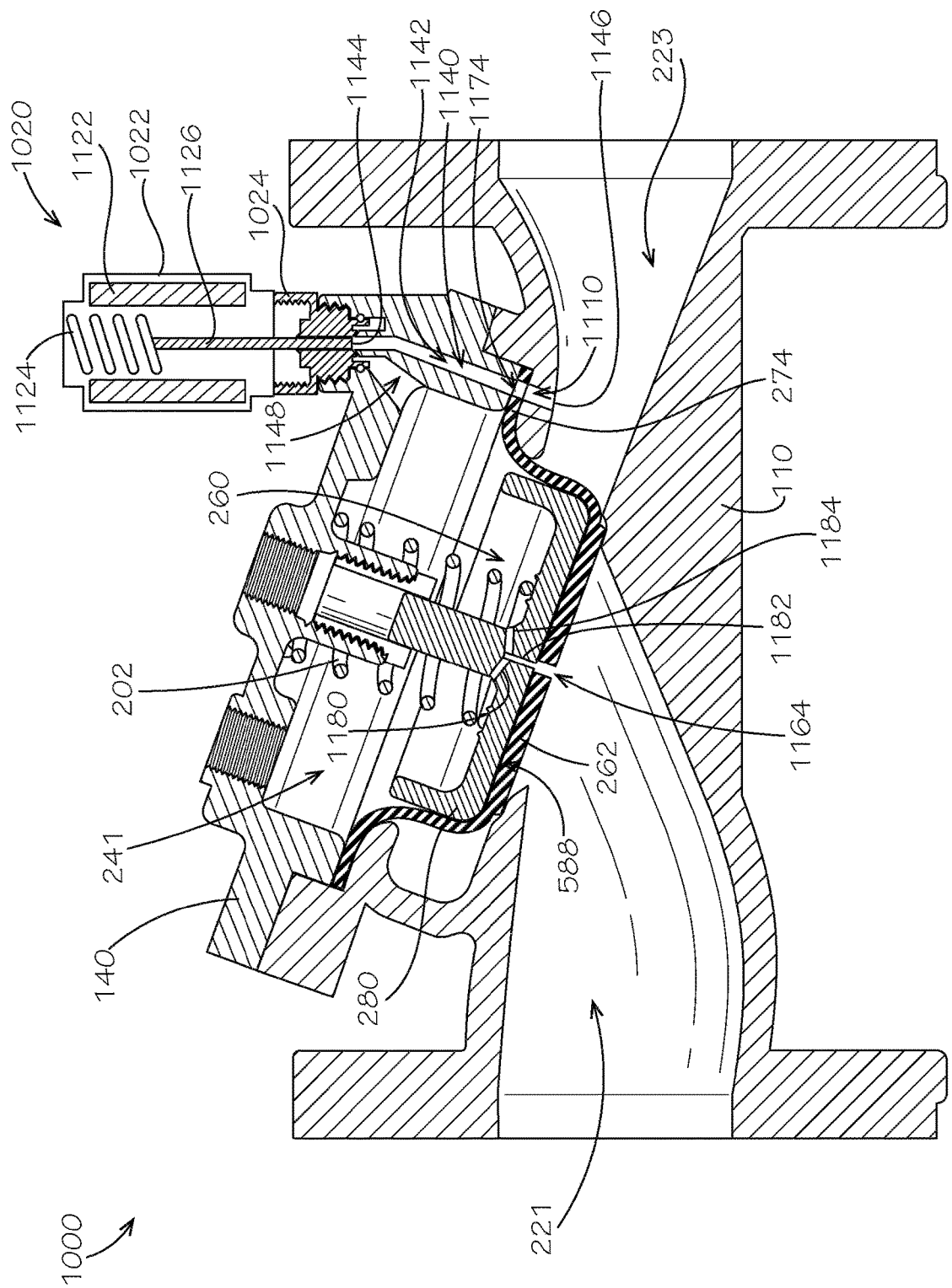
FIG. 11 is a cross-sectional view of the irrigation valve of FIG. 10 taken along line 11-11 in FIG. 10, illustrating the irrigation valve in the closed orientation.

In a particular aspect, the deluge valve 100 can be a pressure control valve 102. For example, the deluge valve 100 can be electronically-operated control valve, such as an electric pilot-operated control valve, as shown in FIGS. 1-9, or an electric solenoid-operated control valve, as shown in FIGS. 10 and 11. In other aspects, the deluge valve 100 can be a pneumatic control valve or any other suitable type of deluge valve 100. According to example aspect, the deluge valve 100 can be attached, connected, or otherwise mounted to a piping system (not shown), which can be configured to transport fluids, such as liquids, gases, or the like. In example aspects, the deluge valve 100 can be positioned between a first pipe element (not shown) and a second pipe element (not shown). The first pipe element can be connected to and in fluid communication with the inlet flange 130 of the valve body 110 and the second pipe element can be connected to and in fluid communication with the outlet flange 132 of the valve body 110. As shown, each of the inlet flange 130 and outlet flange 132 can define mounting bores 134 formed therethrough for mounting the inlet and outlet flanges 130,132 to the corresponding first and second pipe elements, respectively, with nuts and bolts. In normal operation, fluid can flow through the valve body cavity 120 from the inlet end 222 to the outlet end 124, and thus, can be transmitted from the first pipe element to the second pipe element. In some instances, fluid can flow through the valve body cavity 120 in the reverse direction, from the outlet end 124 to the inlet end 222. Furthermore, as shown, in the present aspect, a mounting leg 136 can extend generally downward, relative to the orientation shown, from each of the inlet and outlet flanges 130,132, which can be configured to rest on a support surface (e.g., a ground surface).

Figure 2A:
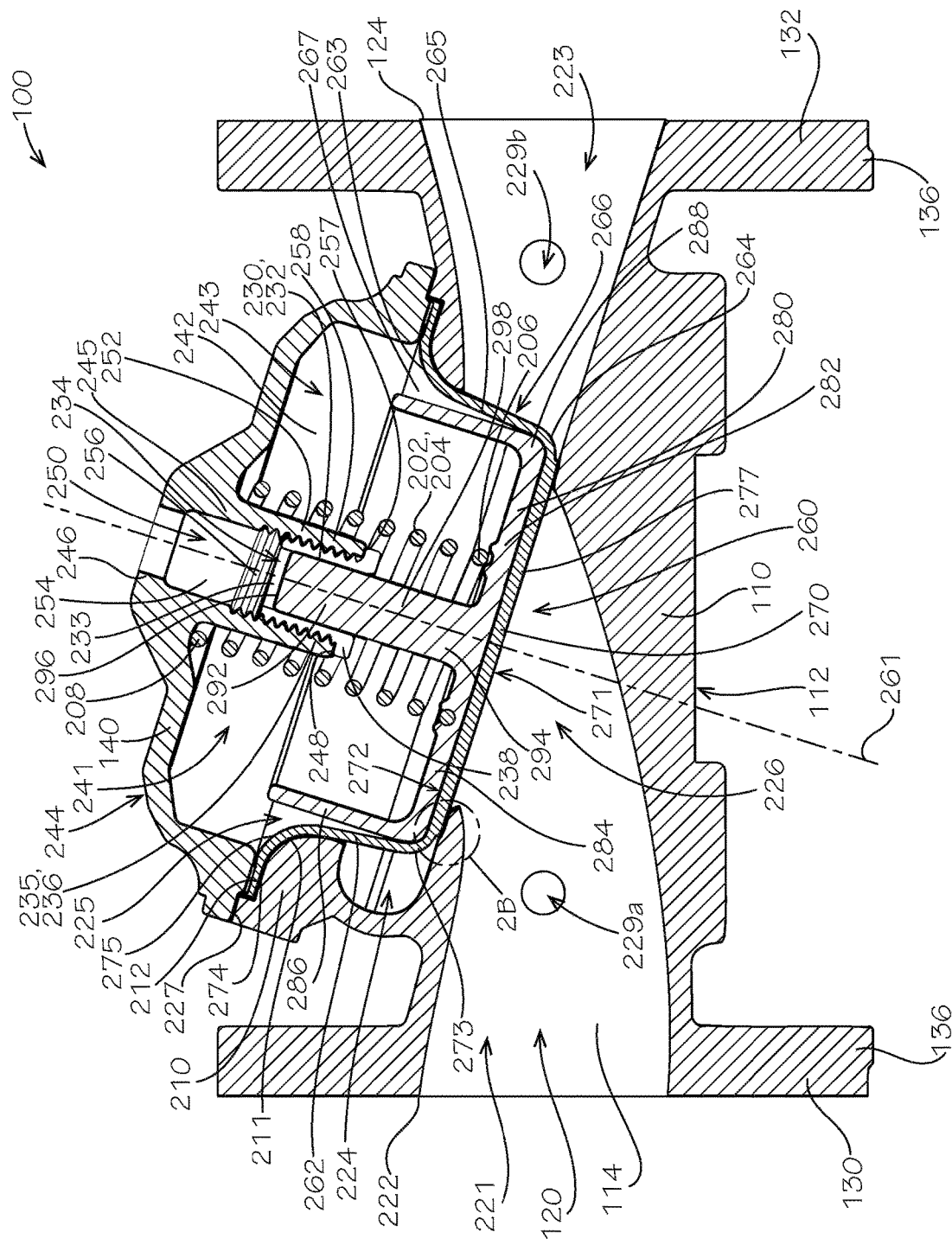
FIG. 2A is a cross-sectional view of the deluge valve of FIG. 1 taken along line 2-2 in FIG. 1, illustrating a seat assembly of the deluge valve in a closed orientation.

FIG. 2A illustrates a cross-sectional view of the deluge valve 100 taken along line 2-2 in FIG. 1. As shown, the inner valve body surface 114 of the central region 226 of the valve body cavity 120 can define an inlet cavity region 221 adjacent the inlet end 222 and an outlet cavity region 223 adjacent the outlet end 124. A seat assembly 260 can be oriented between the inlet cavity region 221 and the outlet cavity region 223, as will be described in further detail below. According to example aspects, a pair of ports 229a,b can be formed through the valve body 110, wherein a first one of the ports 229a can be oriented at the inlet cavity region 221 and a second one of the ports 229b can be oriented at the outlet cavity region 223. Each of the ports 229a,b can be formed as a through-hole that can allow for fluid communication between the valve body cavity 120 and the environment external to the valve body 110. In example aspects, the ports 229a,b can be connected to a pilot system (not shown) that can operate the deluge valve 100. In some aspects, one or both of the ports 229a,b can comprise a sensor (not shown), such as a pressure sensor, connected thereto. The sensor(s) can be configured to detect various features, such as pressure, of the fluid within the valve body cavity 120. In a particular aspect, the port 229a oriented at the inlet cavity region 221 can comprise a first pressure sensor, and the port 229b oriented at the outlet cavity region 223 can comprise a second pressure sensor, such that fluid pressure can be measured before and after flowing past the seat assembly 260. The positioning of the first and second pressure sensors can provide various benefits, such as, for example, the first and second pressure sensors can aid in determining whether the seat assembly 260 of the deluge valve 100 is functioning properly and can aid in detecting unexpected pressure surges or drops in the system. In other aspects, additional or alternative sensors can be included, such as, for example, temperature sensors, water quality sensors, or the like, or any other suitable sensor known in the art.

In example aspects, the inner valve body surface 114 of the valve body 110 can further define an upper cavity region 225 adjacent to an upper valve body end 227 of the valve body 110, relative to the orientation shown. Example aspects of the inlet cavity region 221 and outlet cavity region 223 can curve upward towards the upper cavity region 225, such that the inlet cavity region 221 and outlet cavity region 223 can generally define an inverted V-shape. As shown, the bonnet 140 can be secured to the valve body 110 at the upper valve body end 227 of the deluge valve 100. Example aspects of the bonnet 140 can define an inner bonnet surface 242 and an outer bonnet surface 244. The inner bonnet surface 242 can define a bonnet cavity 243, which can be in fluid communication with the upper cavity region 225 of the valve body 110 when the bonnet 140 is attached to the valve body 110, such that the upper cavity region 225 and the bonnet cavity 243 can generally define an upper chamber 241. Furthermore, as shown, example aspects of the bonnet 140 can define a bonnet post 245 extending from the inner bonnet surface 242 of the bonnet 140 into the bonnet cavity 243 generally at or near a center of the bonnet 140. Example aspects of the bonnet 140 can also define a bonnet bore 250 extending through the bonnet post 245, as illustrated, from a first bonnet post end 246 to a second bonnet post end 248. In some aspects, the bonnet bore 250 can be one of the bonnet plug bores 1050 (shown in FIG. 10), which can be plugged at the first bonnet post end 246 thereof with one of the bonnet plugs 142 (shown in FIG. 1). The bonnet bore 250 can be defined by an inner sidewall surface 254 of a substantially cylindrical bonnet post sidewall 252, as shown. According to example aspects, bonnet threading 256 can be formed on the inner sidewall surface 254 or a portion thereof.

As shown, the seat assembly 260 can be received within the valve body cavity 120 and can be configured to move between an open and closed orientation dependent upon the pressure differential between the upper chamber 241 and the inlet and outlet cavity regions 221,223, as will be described in further detail below with respect to FIG. 9. Example aspects of the seat assembly 260 can define a seat assembly axis 261 through a center thereof. As mentioned, the seat assembly 260 can be positionable in a closed orientation, as shown in the current aspect, and an open orientation, as shown in FIG. 9. In the closed orientation, the seat assembly 260 can form a barrier between the inlet cavity region 221 and the outlet cavity region 223 and can prevent fluid flow therebetween. In the open orientation, fluid can be permitted to flow from the inlet cavity region 221 to the outlet cavity region 223, or vice versa. Example aspects of the seat assembly 260 can comprise a diaphragm 262 and a diaphragm guide 280. The diaphragm 262 can be formed from a substantially resilient material such as, for example, a rubber material, and in a particular aspect, can be formed from EPDM rubber. In a particular aspect, the diaphragm 262 can comprise an anti-wicking fabric coated in a rubber material. In other aspects, the diaphragm 262 can be formed from any other suitable material known in the art, including but not limited to, Buna-N, PTFE, Viton, or neoprene. The resilient material of the diaphragm 262 can allow the diaphragm 262 to bend and flex in operation, as will be described in further detail below. According to example aspects, the diaphragm 262 can define a first diaphragm end 263 and an opposite second diaphragm end 264. As shown, the diaphragm 262 can comprise a substantially cylindrical diaphragm sidewall 265 extending between the first diaphragm end 263 and second diaphragm end 264. Example aspects of the diaphragm sidewall 265 can generally define an outer diaphragm sidewall surface 266 and an opposite inner diaphragm sidewall surface 267. The diaphragm 262 can further comprise a diaphragm end wall 270 oriented at the second diaphragm end 264 of the diaphragm 262, such that the diaphragm end wall 270 and diaphragm sidewall 265 generally form a bowl shape having an open first diaphragm end 263 and a closed second diaphragm end 264. The diaphragm end wall 270 can generally define an outer diaphragm end wall surface 271 and an opposite inner diaphragm end wall surface 272. In example aspects, such as the aspect depicted herein, a joint 273 between the diaphragm end wall 270 and the diaphragm sidewall 265 can define a curved profile.

The diaphragm 262 can also comprise an annular diaphragm flange 274 extending radially outward from the diaphragm sidewall 265, relative to the seat assembly axis 261, at the first diaphragm end 263 of the diaphragm 262. Example aspects of the diaphragm flange 274 can be coupled to the valve body 110 to attach the seat assembly 260 to the deluge valve 100. For example, as shown, an annular slot 212 can be formed between the valve body 110 and the bonnet 140. The annular diaphragm flange 274 can be clamped within the annular slot 212 to secure the diaphragm 262 to the valve body 110. In some aspects, fasteners (not shown) can also be provided to further aid in securing the diaphragm 262 to the valve body 110. In the present aspect, an annular joint 275 between the diaphragm flange 274 and the diaphragm sidewall 265 can define a bend of about 90°. Example aspects of the valve body 110 can comprise an annular diaphragm support flange 210 oriented substantially at or near the upper valve body end 227, as shown. The diaphragm support flange 210 can define a rounded support surface 211 that can be configured to engage and support the diaphragm flange 274 at and around the annular joint 275.

According to example aspects, as shown, the diaphragm sidewall 265, diaphragm end wall 270, and diaphragm flange 274 can be monolithically formed. However, in other aspects, one or all of the diaphragm sidewall 265, diaphragm end wall 270, and diaphragm flange 274 may be separately formed. Furthermore, as noted above, the diaphragm 262 can be formed from a substantially resilient material, such as, for example, a rubber material, and in a particular aspect, EPDM rubber, such that diaphragm 262 can bend and flex in operation. In other aspects, the diaphragm 262 can be formed from any other suitable material known in the art, including but not limited to, Buna-N, PTFE, Viton, or neoprene.

The diaphragm guide 280 of the seat assembly 260 can comprise a guide piston 282 and a guide stem 292, as illustrated. According to example aspects, the diaphragm guide 280 can be formed from a substantially rigid material, such as, for example, a rigid plastic or metal material. Other aspects of the diaphragm guide 280 can be formed from any other suitable material known in the art providing substantial rigidity. Example aspects of the guide piston 282 can comprise a substantially circular, flat guide disc 284 configured to engage the inner diaphragm end wall surface 272 of the diaphragm end wall 270. In example aspects, the guide disc 284 can be configured to engage the entire inner diaphragm end wall surface 272 or nearly the entire inner diaphragm end wall surface 272. The guide piston 282 can further comprise a substantially cylindrical guide sidewall 286 extending substantially orthogonally from the guide disc 284 proximate to the inner diaphragm sidewall surface 267 of the cylindrical diaphragm sidewall 265. In example aspects, a joint 288 between the guide disc 284 and the guide sidewall 286 can define a curved profile. According to example aspects, the joint 273 between the diaphragm end wall 270 and the diaphragm sidewall 265 can resiliently deform to substantially match the curved profile of the joint 288 between the guide disc 284 and the guide sidewall 286 in the closed orientation.

As shown, in the present aspect, the guide stem 292 can extend from a center of the guide disc 284 and can define a first stem end 294 coupled to the guide disc 284, a second stem end 296 opposite the first stem end 294, and a stem body 298 therebetween. The guide stem 292 can extend away from the diaphragm end wall 270 and can be concentric with the seat assembly axis 261. According to example aspects, the bonnet bore 250 can also be concentric with the seat assembly axis 261, and the guide stem 292 can slidably extend into the bonnet bore 250, as shown, and can be configured to move axially therein, relative to the seat assembly axis 261. In some aspects, a bearing 230, such as, for example, a guide bushing 232, can be secured to the bonnet post sidewall 252 proximate to the second bonnet post end 248. Example aspects of the guide bushing 232 can comprise an inner bushing surface 233 and an outer bushing surface 235. The inner bushing surface 233 can define a bushing bore 234, which the guide stem 292 can be configured to extend into and slide within. The guide bushing 232 of the present aspect can define bushing threading 236 on the outer bushing surface 235 thereof that can be configured to mate with the bonnet threading 256 formed on the inner sidewall surface 254 of the bonnet post sidewall 252 to couple the guide bushing 232 to the bonnet post sidewall 252. Moreover, according to example aspects, the guide bushing 232 can define an annular bushing flange 238 that can be configured to engage a bottom sidewall end 257 of the bonnet post sidewall 252 to serve as a stop for limiting the depth at which the guide bushing 232 can be threaded with the bonnet bore 250. As shown, the bottom sidewall end 257 can be formed at the second bonnet post end 248. As such, the guide bushing 232 can be threaded with the inner sidewall surface 254 of the bonnet post sidewall 252 until the annular bushing flange 238 abuts the bottom sidewall end 257 to retain the guide bushing 232 in position within the bonnet bore 250. When the seat assembly 260 moves between the closed orientation and the raised orientation, the guide stem 292 can slide axially within the bushing bore 234 and the bonnet bore 250, relative to the seat assembly axis 261, while the guide bushing 232 remains stationary relative to the bonnet 140, as will be described in further detail below.

In some aspects, as shown, an annular channel 224 in fluid communication with the outlet cavity region 223 can be formed in the inner valve body surface 114 of the valve body 110 and generally positioned between a valve body step 216 (shown in FIG. 2B) and the diaphragm support flange 210. The annular channel 224 can allow fluid to flow around the diaphragm 262 from the inlet cavity region 221 to the outlet cavity region 223 when the seat assembly 260 is in the open orientation. As such, a fluid force of the fluid flowing therethrough can be distributed around the diaphragm 262, thus reducing the fluid force directly against the diaphragm 262 and reducing the likelihood of damage to the seat assembly 260.

According to example aspects, the deluge valve 100 can further comprise a control system (not shown), which can be configured to control the pressure within the upper chamber 241. In example aspects, pressure can be increased in the upper chamber 241 by admitting fluid into the upper chamber 241, and pressure can be decreased in the upper chamber 241 by releasing fluid from the upper chamber 241. When the upper chamber 241 has been sufficiently pressurized, the seat assembly 260 can be pushed towards the closed orientation to the seal the seat assembly 260 with the valve body 110 and to prohibit fluid flow from the inlet cavity region 221 to the outlet cavity region 223. Furthermore, as shown, the guide stem 292 can extend through a center of a spring 202. In the present aspect, the spring 202 can extend between the guide piston 282 and the inner bonnet surface 242 of the bonnet 140, as shown, and can further aid in biasing the seat assembly 260 towards the illustrated closed orientation. As such, the spring 202 can be, for example, a compression spring 204, which can be configurable in a compressed configuration and an expanded configuration, and which can define a spring force. According to example aspects, in the expanded configuration, the spring 202, along with increased pressure in the upper chamber 241, can bias the seat assembly 260 towards the closed orientation. In the compressed configuration, the spring force can be overcome to compress the spring 202 partially or fully, which can allow the seat assembly 260 to move to the open orientation. For example, the spring force may be overcome by reducing the pressure in the upper chamber 241 with the control valve, such that the spring force and reduced pressure in the upper chamber 241 are less than the pressure in the inlet cavity region 221.

In example aspects of the deluge valve 100, a first spring end 206 of the spring 202 can engage the guide disc 284 of the guide piston 282 to attach the spring 202 to the seat assembly 260, as will be described in further detail below. Furthermore, a second spring end 208 of the spring 202 opposite the first spring end 206 can engage the inner bonnet surface 242 of the bonnet 140 to retain the spring 202 between the seat assembly 260 and the bonnet 140. As shown, in example aspects, at least a lower portion 258 of the cylindrical bonnet post sidewall 252 can extend from the inner bonnet surface 242 and through the center of the spring 202. The guide stem 292 can engage the bonnet bore 250 within the spring 202, as shown, and as such, the spring 202 can be substantially concentric with the seat assembly axis 261.

Figure 2B:
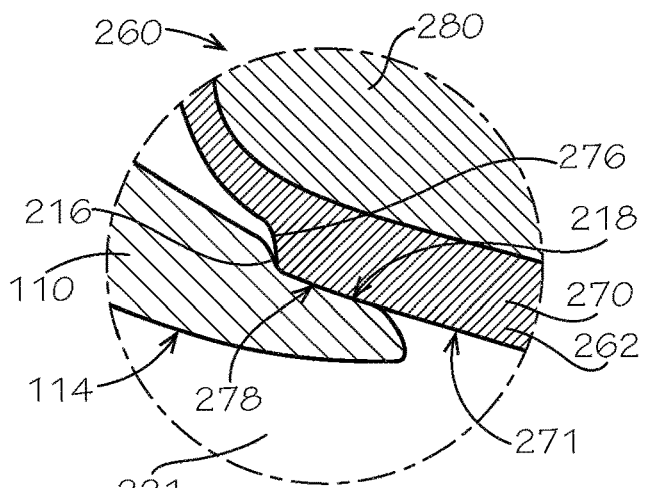
FIG. 2B is a detail view of Detail 2B of FIG. 2A showing the seat assembly of FIG. 2A seated with a valve body of the deluge valve of FIG. 1.

FIG. 2B illustrates a detail view of Section 2B of FIG. 2A. According to example aspects, the inner valve body surface 114 of the valve body 110 can define an annular valve body step 216 formed therein generally between the inlet cavity region 221 and the outlet cavity region 223 (shown in FIG. 2A). The valve body 110 can further define an annular valve body sealing surface 218 formed on the inner valve body surface 114 between the inlet and outlet cavity regions 221,223 and adjacent to the valve body step 216. Example aspects of the seat assembly 260 can be configured to seat with the valve body step 216 and valve body sealing surface 218 to seal the seat assembly 260 with the valve body 110 and to prevent fluid flow between the inlet and outlet cavity regions 221,223, as will be described in further detail below. For example, as shown, in example aspects the outer diaphragm end wall surface 271 of the diaphragm end wall 270 can define an annular diaphragm step 276 and a head pad 277. The head pad 277 can define an annular diaphragm sealing surface 278 adjacent to the diaphragm step 276. In the closed position, the spring 202 (shown in FIG. 2A) can bias the diaphragm guide 280 against the diaphragm 262, which can push the diaphragm 262 into engagement with the inner valve body surface 114 of the valve body 110. For example, the annular diaphragm step 276 can engage the annular valve body step 216 formed on the inner valve body surface 114 and the annular diaphragm sealing surface 278 can engage the annular valve body sealing surface 218 to seal the diaphragm 262 with the valve body 110 and to prevent fluid flow from the inlet end 222 to the outlet end 124. According to some example aspects, the diaphragm sealing surface 278 can comprise an abrasion-resistant material or coating to minimize or prevent damage to diaphragm sealing surface 278. In other aspects, the entire head pad 277 or the entire diaphragm 262 can comprise the abrasion-resistant material or coating. Still other aspects of the diaphragm sealing surface 278 may not comprise the abrasion-resistant material or coating.

Figure 3:
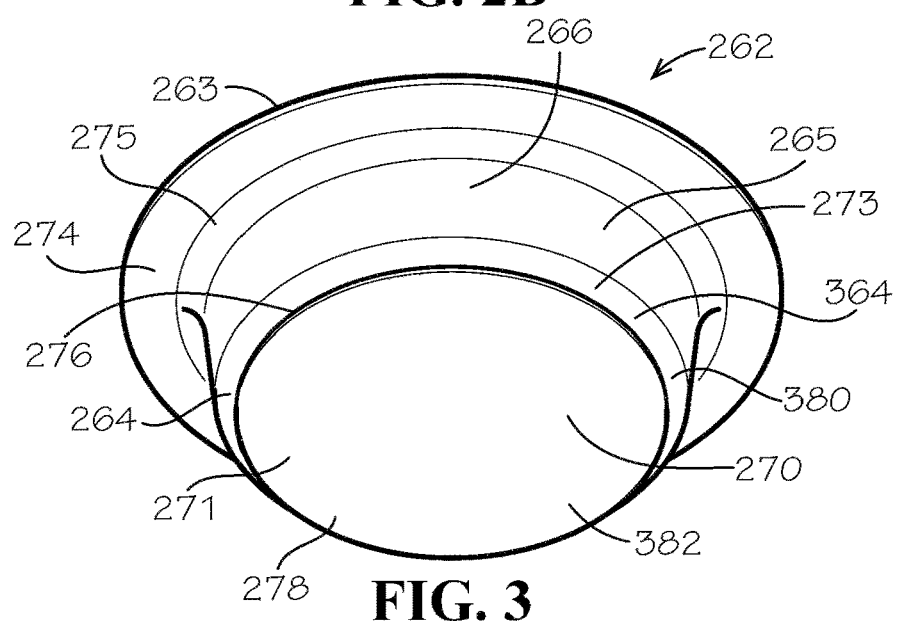
FIG. 3 is a bottom perspective view of a diaphragm of the seat assembly of FIG. 2A.
Figure 4:
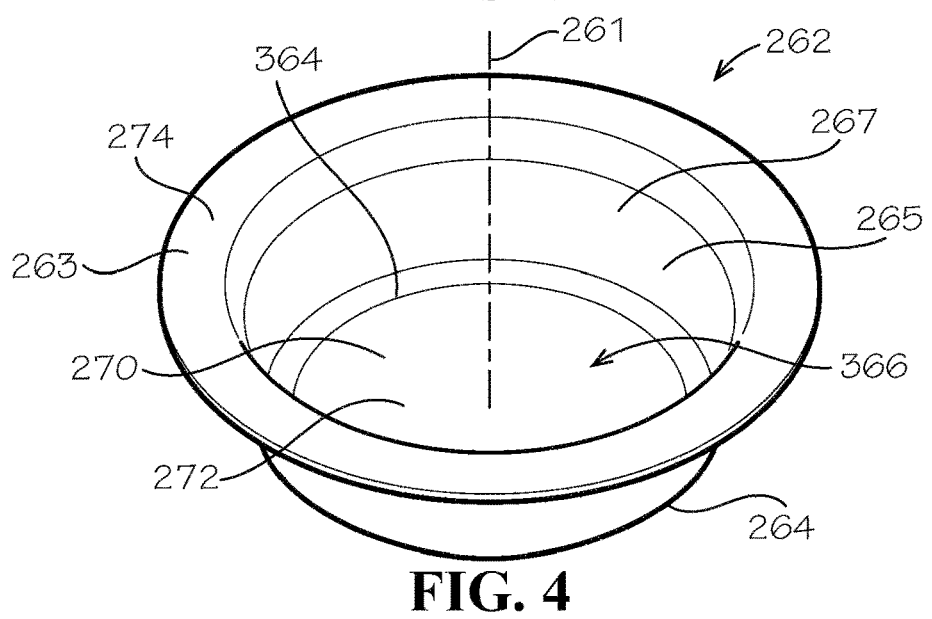
FIG. 4 is a top perspective view of the diaphragm of FIG. 3.

FIGS. 3 and 4 illustrate a top and bottom perspective view of the diaphragm 262, respectively. As shown, the diaphragm 262 can comprise the diaphragm end wall 270, the diaphragm flange 274, and the diaphragm sidewall 265 extending therebetween from the first diaphragm end 263 to the second diaphragm end 264. The annular diaphragm flange 274 can extend radially outward, relative to the seat assembly axis 261, from the diaphragm sidewall 265 at the first diaphragm end 263 of the diaphragm 262. The diaphragm end wall 270 can be substantially circular in shape and the diaphragm sidewall 265 can be substantially cylindrical in shape and can extend from an outer diaphragm end wall edge 364 of the diaphragm end wall 270 at the second diaphragm end 264 of the diaphragm 262. According to example aspects, the diaphragm sidewall 265 and diaphragm end wall 270 can define a hollow region 366 of the diaphragm 262 therebetween within which the diaphragm guide 280 (shown in FIG. 2A) can be received. Moreover, as shown in FIG. 3, the outer diaphragm end wall surface 271 of the diaphragm end wall 270 can define the annular diaphragm step 276, such that the outer diaphragm end wall surface 271 defines an annular diaphragm recess 380 proximate the outer diaphragm end wall edge 364 and a circular diaphragm plateau 382 at a center of the diaphragm end wall 270. As noted above, the diaphragm 262 can be formed from a substantially resilient material, such that diaphragm 262 can bend and flex in operation, as will be described in further detail below.

Figure 5:
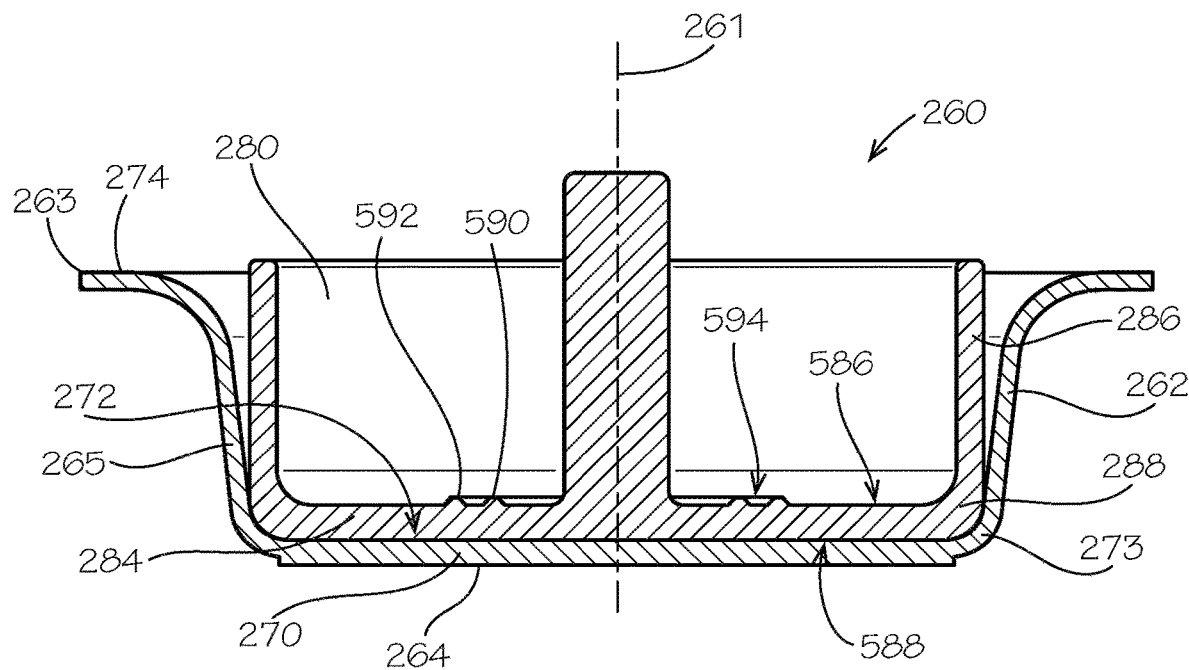
FIG. 5 is a cross sectional view of a diaphragm guide of the seat assembly of FIG. 2A engaged with the diaphragm of FIG. 3 taken along line 2-2 of FIG. 1.

FIG. 5 illustrates a cross-sectional view of the seat assembly 260 comprising the diaphragm guide 280 and the diaphragm 262. According to example aspects, the guide disc 284 can define an inner guide disc surface 586 and an outer guide disc surface 588. As shown, the outer guide disc surface 588 can be substantially sized and shaped to fully engage the inner diaphragm end wall surface 272 of the diaphragm end wall 270. In some aspects, the guide disc 284 can be attached to the diaphragm end wall 270 by a fastener, such as, for example, an adhesive, or any other suitable fastener known in the art. Furthermore, as described above, the diaphragm 262 can be formed from a resilient material, such that the joint 273 between the diaphragm end wall 270 and the diaphragm sidewall 265 can resiliently deform to substantially match the curved profile of the joint 288 between the guide disc 284 and the guide sidewall 286 in the closed orientation. The cylindrical diaphragm sidewall 265 can extend generally upwardly from the diaphragm end wall 270, relative to the orientation shown, and can fan slightly radially outward from the cylindrical guide sidewall 286, relative to the seat assembly axis 261, as shown, especially when attached to the deluge valve 100, as shown in FIG. 2A. In other aspects, however, the diaphragm sidewall 265 may not fan outward from the guide sidewall 286, or only a portion of the diaphragm sidewall 265 may fan out, such that the diaphragm sidewall 265 may extend fully or partially alongside the guide sidewall 286. According to example aspects, such as the present aspect, the annular diaphragm flange 274 can extend generally radially outward from the diaphragm sidewall 265 at the first diaphragm end 263, relative to the seat assembly axis 261, such that the diaphragm flange 274 can be oriented substantially perpendicular to the guide sidewall 286 of the diaphragm guide 280 and substantially parallel to the diaphragm end wall 270, as shown.

Figure 6:
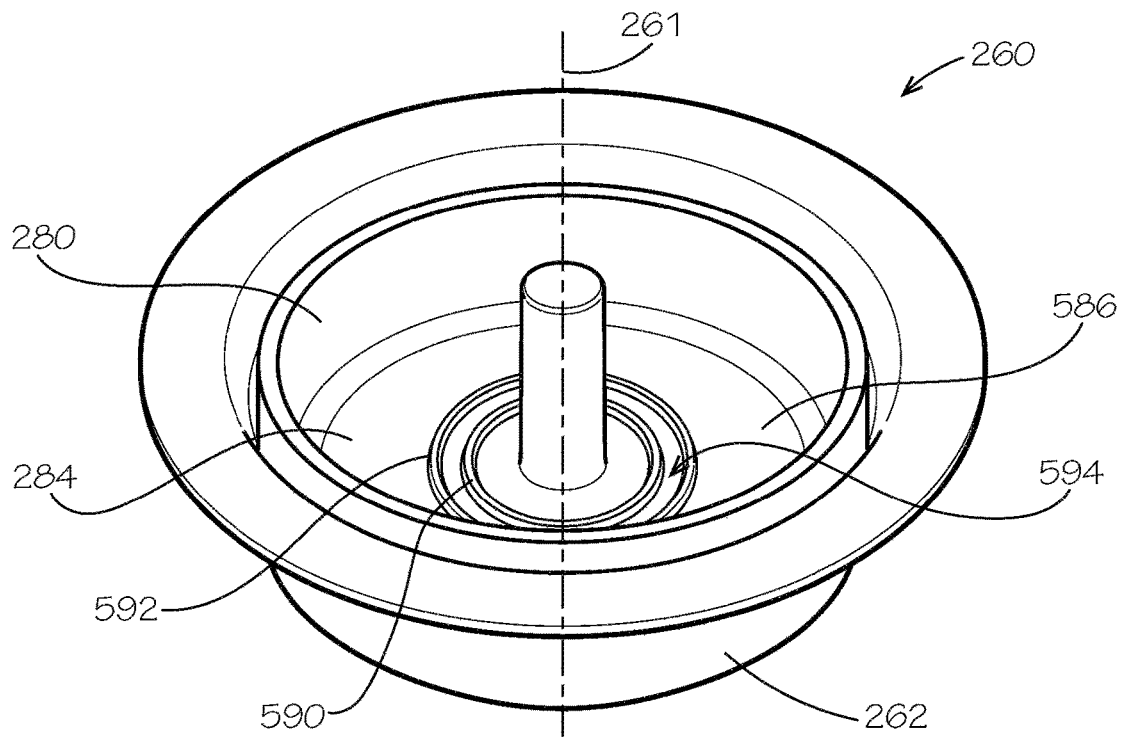
FIG. 6 is a top perspective view of the seat assembly of FIG. 2A.

As shown in FIGS. 5 and 6, an annular inner disc lip 590 and an annular outer disc lip 592 can extend from the inner guide disc surface 586 and can be substantially concentric to the seat assembly axis 261. An annular disc groove 594 can be formed in the inner guide disc surface 586 between the inner and outer disc lips 590,592, as shown. According to example aspects, the first spring end 206 (shown in FIG. 2A) of the spring 202 (shown in FIG. 2A) can be configured to engage the annular disc groove 594 such that the annular disc groove 594 retains the first spring end 206, as shown and described in further detail with respect to FIGS. 7 and 8.

Figure 7:
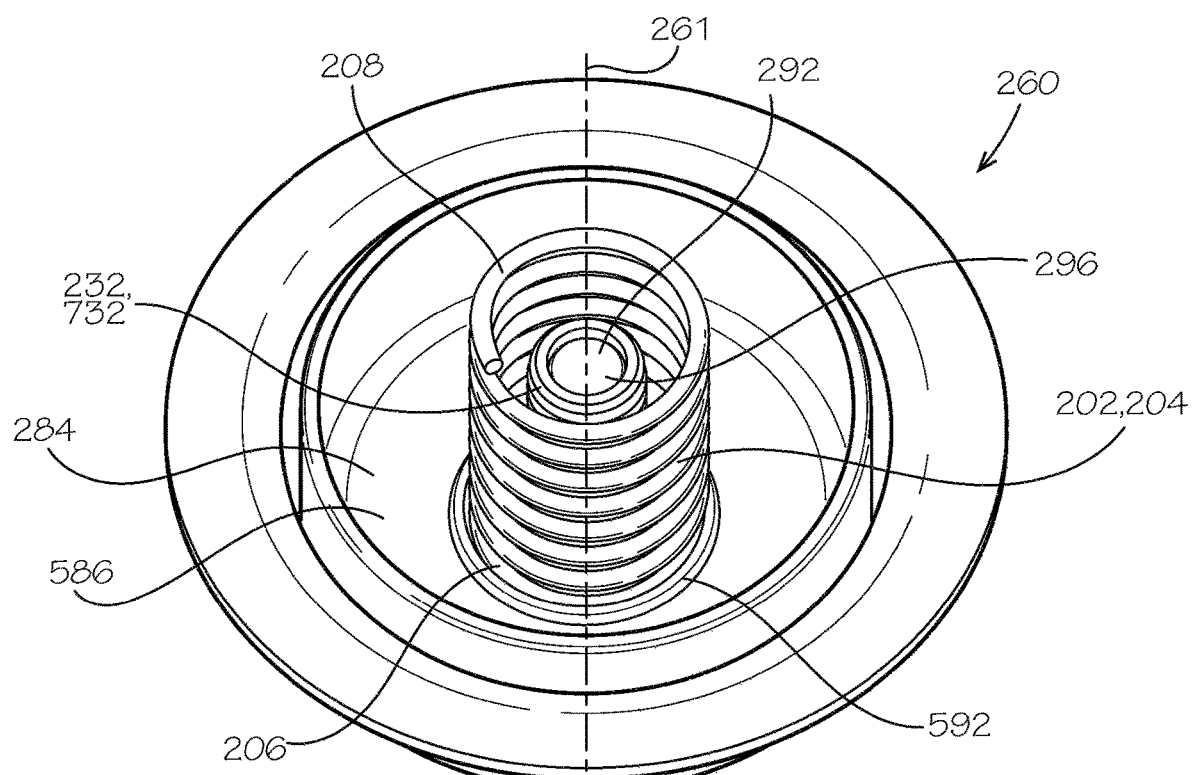
FIG. 7 is a top perspective view of a spring engaged with the seat assembly of FIG. 2A.
Figure 8:
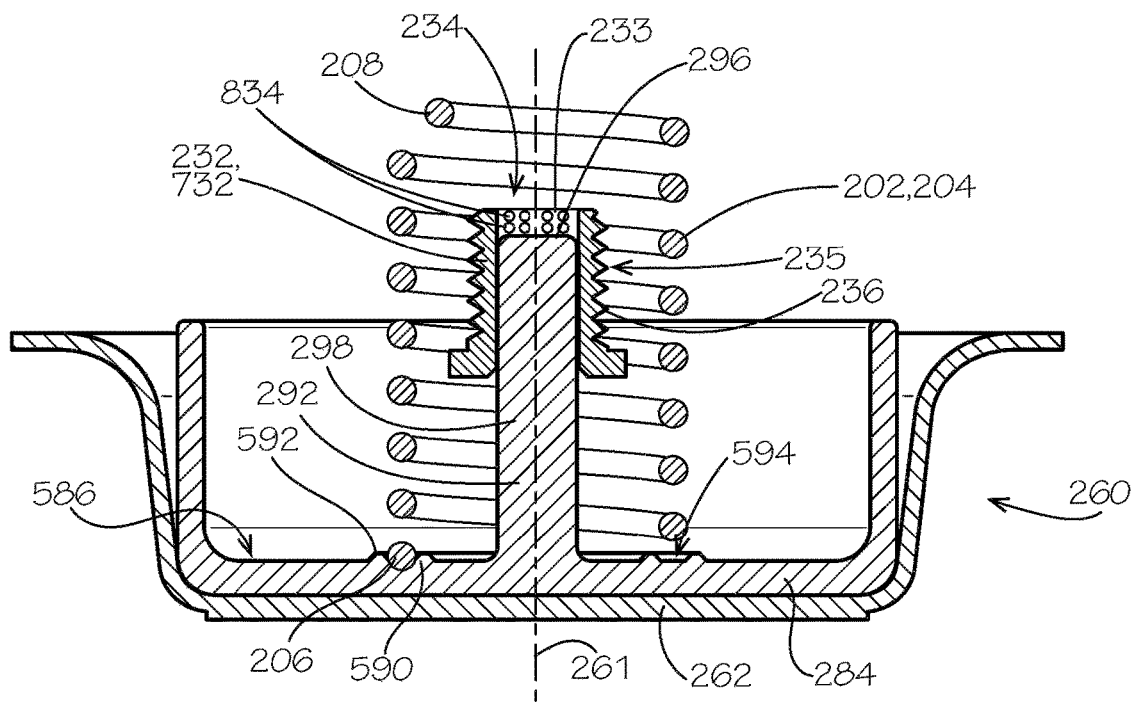
FIG. 8 is a cross-sectional view of a spring of FIG. 7 engaged with the seat assembly of FIG. 2A.

FIGS. 7 and 8 illustrate the spring 202, for example, the compression spring 204, engaged with the seat assembly 260. As shown, the first spring end 206 of the spring 202 can engage the annular disc groove 594 formed in the inner guide disc surface 586 of the guide disc 284 to position the spring 202 relative to the seat assembly 260. In some instances, the spring 202 can be coupled to the guide disc 284 by a fastener (not shown), such as, for example, an adhesive, or any other suitable fastener. In other aspects, the inner and outer disc lips 590,592 can engage (e.g., fully or partially wrap around) the first spring end 206 of the spring 202 to retain the spring 202 in position against the guide disc 284. As shown, according to example aspects, the spring 202 can extend away from the guide disc 284 in the axial direction, relative to the seat assembly axis 261, such that the second spring end 208 is distal to the guide disc 284, and the guide stem 292 can extend through the center of the spring 202 along the seat assembly axis 261. In the present aspect, as illustrated, the second spring end 208 of the spring 202 can extend beyond the second stem end 296 of the guide stem 292 when the spring 202 is in the expanded configuration. In other aspects, however, the second spring end 208 may not extend past the second stem end 296 in the expanded configuration.

Moreover, as shown, the guide stem 292 can be configured to slidably engage the guide bushing 232. According to example aspects, the guide bushing 232 can be a slide bushing 732, which can allow for linear motion of the guide stem 292 therethrough. For example, in the present aspect, as shown in FIG. 8, the slide bushing 732 can comprise a plurality of rolling ball elements 834 disposed on the inner bushing surface 233 thereof. As shown, in example aspects, the inner bushing surface 233 can define the bushing bore 234 through which the guide stem 292 can extend. The bushing bore 234 can define a substantially circular cross-sectional shape that can define a diameter slightly largely than a diameter of the guide stem 292, such that a clearance is defined therebetween. The rolling ball elements 834 can bridge the clearance to engage the stem body 298 of the guide stem 292, such that the guide stem 292 is able to slide along the rolling ball elements 834 within the bushing bore 234 and is restricted to substantially linear movement. Furthermore, as shown, the outer bushing surface 235 of the guide bushing 232 can define the bushing threading 236 configured to mate with the bonnet threading 256 (shown in FIG. 2A) formed on the inner sidewall surface 254 (shown in FIG. 2A) of the bonnet post sidewall 252 (shown in FIG. 2A).

FIG. 9 is a cross-sectional view of the deluge valve 100 taking along line 2-2 in FIG. 1, illustrating the seat assembly 260 in the open orientation. As described above, the control system can sufficiently pressurize the upper chamber 241 of the deluge valve 100 by admitting fluid into the upper chamber 241. The pressure in the upper chamber 241 and the spring 202 positioned between the guide piston 282 and the bonnet 140 can bias the seat assembly 260 to the closed orientation, as shown in FIG. 2A. The inlet cavity region 221 can be sealed off from the outlet cavity region 223 in the closed orientation to prevent fluid flow therebetween. To allow the seat assembly 260 to move to the open orientation, and to thus open the deluge valve 100 and allow fluid to flow from the inlet cavity region 221 to the outlet cavity region 223, the control system can decrease the pressure in the upper chamber 241 by releasing fluid from the upper chamber 241. When the pressure in the upper chamber 241 is sufficiently decreased, such that the pressure in the inlet cavity region 221 is greater than the forces biasing the seat assembly 260 to the closed orientation (i.e., the spring force and the pressure in the upper chamber 241), the pressure in the inlet cavity region 221 can force the seat assembly 260 generally upward, relative to the orientation shown. As the seat assembly 260 moves upward, the guide stem 292 can slide within the bushing bore 234 (shown in FIG. 2A) of the guide bushing 232, so that the seat assembly 260 can travel in a smooth, linear motion. A fluid opening 920 can be defined between the inlet cavity region 221 and the outlet cavity region 223 as the seat assembly 260 moves upward, allowing fluid to flow therethrough.

In the present aspect, as the seat assembly 260 moves to the open orientation, the diaphragm end wall 270 can remain substantially flat against the guide disc 284, as shown, and can move in a generally linear motion along with the guide disc 284. Furthermore, the resilient diaphragm sidewall 265 can be configured to flex and bend in the open orientation. For example, in the present aspect, the diaphragm sidewall 265 can bend to define a substantially U-shaped fold 965 proximate to the diaphragm flange 274. In the illustrated example aspect, the U-shaped fold 965 extends generally upward, relative to the orientation shown. According to some example aspects, the rounded support surface 211 of the diaphragm support flange 210 can aid in preventing the diaphragm sidewall 265 from inverting and folding in a downward direction, relative to the orientation shown. However, in other aspects, the U-shaped fold 965 may extend downward. In still other aspects, the diaphragm sidewall 265 can be configured to fold or otherwise bend into any other suitable configuration in the open orientation.

According to example aspects, with the seat assembly 260 in the open orientation, the deluge valve 100 can be in a fully open configuration or a partially open configuration. In the fully open configuration, the seat assembly 260 can be raised to its maximum height, wherein the inner guide disc surface 586 of the guide disc 284 can abut the annular bushing flange 238 of the guide bushing 232. In the partially open configuration, the diaphragm sealing surface 278 can be disengaged from the valve body sealing surface 218 to allow fluid flow between the inlet and outlet cavity regions 221, 223, but the seat assembly 260 can be raised to a height that can be less than its maximum height. In example aspects, the height to which the seat assembly 260 is raised can be determined by the amount of pressure in the upper chamber 241, and thus can be controlled by the control system. In the fully open configuration, the fluid opening 920 can be at its maximum size and the rate of fluid flow from the inlet cavity region 221 to the outlet cavity region 223 can be at its maximum flow rate. In the partially open configuration, the size of the fluid opening 920 can be reduced, and the flow rate can be less than the maximum flow rate. As such, a desired fluid flow rate can be set by selectively adjusting the pressure in the upper chamber 241.

FIGS. 10 and 11 illustrate the valve according to another aspect of the present disclosure, wherein the valve can be an irrigation valve 1000. In other aspects, however, the valve can be any other suitable type of valve. In the present aspect, the irrigation valve 1000 can be operated by a solenoid system 1020. Referring to FIG. 10, example aspect of the solenoid system 1020 can comprise a protective solenoid housing 1022 coupled to the bonnet 140, within which various components of the solenoid system 1020 can be housed. In some aspects, the solenoid housing 1022 can be connected to a solenoid connector 1024, which in turn can be coupled to the bonnet 140, as shown. In other aspects, the solenoid housing 1022 can be directly coupled to the bonnet 140. Furthermore, as shown, aspects of the irrigation valve 1000 comprising the solenoid system 1020 may not comprise the ports 229a,b (shown in FIG. 2A). The solenoid system 1020 is described in further detail below with respect to FIG. 11.

As described above, the bonnet 140 can be coupled to the valve body 110 by one or more fasteners (not shown), such as, for example, nut and bolt assemblies, screws, welding, adhesives, and the like. In the present aspect, as shown, the bonnet 140 can define a plurality of bonnet bolt holes 1046, which can extend from the outer bonnet surface 244 to the inner bonnet surface 242 (shown in FIG. 2A), generally from a bonnet top end 1042 to a bonnet bottom end 1044. Each of the bonnet bolt holes 1046 can be aligned with a corresponding valve body bolt hole (not shown), and a bolt can be configured to extend through each corresponding pair of bonnet bolt holes 1046 and valve body bolt holes.

In example aspects, the valve body 110 can further comprise a plurality of nut positioning slots 1012 formed therein. Each of the nut positioning slots 1012 can extend inward from the outer valve body surface 112 of the valve body 110, proximate to the bonnet 140, and can intersect a corresponding one of the valve body bolt holes at a substantially perpendicular angle. A nut (not shown) can be received in each of the nut positioning slots 1012, and the bolt passing through the corresponding bonnet bolt hole 1046 and valve body bolt hole can engage the nut (e.g., threadably engage) to secure the bonnet 140 to the valve body 110. In some aspects, the shape of each of the nut positioning slots 1012 can correspond to the shape of the nut received therein. For example, in a particular aspect, each of the nuts can define a substantially hexagonal cross-sectional shape, and each of the nut positioning slots 1012 can define a portion at least partially contoured to the hexagonal cross-section of the nut. The hexagonally contoured portion of the nut positioning slot 1012 can engage the corresponding nut to retain the nut in position within the slot 1012 and prevent rotation therein.

Example aspects of the bonnet 140 can further define the one or more of the bonnet plug bores 1050 formed therein, wherein the bonnet plug bores 1050 can extend from the outer bonnet surface 244 to the inner bonnet surface 242. As described above, in some aspects, the bonnet bore 250 (shown in FIG. 2A) can be one of the bonnet plug bores 1050. Furthermore, one of the bonnet plugs 142 can be received in each of the bonnet plug bores 1050 to seal the bonnet plug bores 1050. In the present aspect, as shown, the bonnet plug bores 1050 can define bore threading 1052 configured to engage mating threading on the corresponding bonnet plug 142. Moreover, in some aspects, the valve body 110 and/or bonnet 140 can be formed from a plastic material. In some aspects, wherein the valve body 110 and/or bonnet 140 are formed from plastic, various material thicknesses of the valve body 110 and/or bonnet 140 can be increased when compared to aspects comprising a metal material, such as cast iron (as described above).

FIG. 11 is a cross-sectional view of the irrigation valve 1000 of FIG. 10 taken along line 11-11 in FIG. 10. As shown, the solenoid system 1020 can comprise a solenoid 1122 housed within the solenoid housing 1022. A spring 1124 and a plunger 1126 can also be received within the solenoid housing 1022 and can extend generally through a center of the solenoid 1122, with the spring 1124 biasing the plunger 1126 downward, relative to the orientation shown, to a closed position, as shown. In example aspects, the plunger 1126 can also extend through the solenoid connector 1024 and can abut a channel inlet 1144 of a depressurization channel 1142 in the closed position to seal the depressurization channel 1142. As shown, the depressurization channel 1142 can be defined by a bonnet channel 1140 formed through the bonnet 140, a flange opening 1174 formed through the diaphragm flange 274, and a valve body channel 1110 formed through the valve body 110, with the channel inlet 1144 formed at the bonnet 140 and an opposite channel outlet 1146 formed at the outlet cavity region 223 of the valve body 110. In some aspects, the plunger 1126 can extend into the depressurization channel 1142 in the closed position. According to example aspects, an electrical current can be conducted through the solenoid 1122 to produce a magnetic field. When the magnetic field is generated, it can pass through the plunger 1126, which can draw the plunger 1126 upward against the spring 1124 to an open position. In the open position, the plunger 1126 can be spaced away from the channel inlet 1144 to unseal the depressurization channel 1142, as described in further detail below.

In the present aspect, a central equalization hole 1164 can be formed through the diaphragm 262 and an equalization passage 1180 can be formed through the diaphragm guide 280. In the present aspect, the equalization passage 1180 can define a central equalization channel 1182 extending into the diaphragm guide 280 at the outer guide disc surface 588 thereof, which can be substantially aligned with the central equalization hole 1164 of the diaphragm 262. The equalization passage 1180 can further define one or more equalization ports 1184 formed in the diaphragm guide 280, the equalization ports 1184 extending from the equalization channel 1182 to the upper chamber 241. As such, the equalization passage 1180 can extend from the equalization hole 1164 to the upper chamber 241. The equalization hole 1164 and equalization passage 1180 (e.g., the channel 1182 and ports 1184) can define an equalization pathway from the inlet cavity region 221 to the upper chamber 241, such that the inlet cavity region 221 and upper chamber 241 can be in fluid communication and the pressure in the inlet cavity region 221 and the pressure in the upper chamber 241 can be equalized. With equal pressure in each of the inlet cavity region 221 and upper chamber 241, the spring 202 can bias the seat assembly 260 to the closed orientation, as shown.

According to example aspects, the bonnet 140 can define a depressurization port 1148 formed therethrough, the depressurization port 1148 extending from the upper chamber 241 to the solenoid connector 1024. The bonnet 140 can also define the depressurization channel 1142 formed therethrough, the depressurization channel 1142 extending from the solenoid connector 1024 to the outlet cavity region 223. The depressurization port 1148, solenoid connector 1024, and depressurization channel 1142 can define a depressurization pathway from the upper chamber 241 to outlet cavity region 223, such that the upper chamber 241 and outlet cavity region 223 can be in fluid communication when the depressurization pathway is unsealed in the open position of the plunger 1126, allowing pressure from the upper chamber 241 to be released into the outlet cavity region 223, thus depressurizing the upper chamber 241.

As described above, when the plunger 1126 of the solenoid system 1020 is in the closed position, the plunger 1126 can abut the channel inlet 1144 of the depressurization channel 1142, thus sealing the depressurization pathway and preventing pressure in the upper chamber 241 from being released therethrough to the outlet cavity region 223. As such, in the closed position, the pressure in the upper chamber 241 and inlet cavity region 221 can remain equalized by way of the equalization pathway, and the seat assembly 260 can remain in the closed orientation, as shown. When the plunger 1126 is in the open position, however, the depressurization pathway can be clear and pressure in the upper chamber 241 can be released into the outlet cavity region 223 through the depressurization pathway.

In example aspects, pressure can be released from the upper chamber 241 to the outlet cavity region 223 through the depressurization pathway quicker than the pressure in the upper chamber 241 can be equalized with the pressure in the inlet cavity region 221 through the equalization pathway. As such, as the pressure in the upper chamber 241 decreases, the pressure in the inlet cavity region 221 can be greater than the pressure in the upper chamber 241. As described above, the spring force of the spring 202 biasing the seat assembly 260 to the closed orientation can be overcome by reducing the pressure in the upper chamber 241, such that the spring force and reduced pressure in the upper chamber 241 can be less than the pressure in the inlet cavity region 221. When the spring force is overcome by the pressure in the inlet cavity region 221, the spring 202 can be fully or partially compressed and the seat assembly 260 can move to the open orientation, allowing fluid to flow from the inlet cavity region 221 to the outlet cavity region 223. According to example aspects, the sizes of the equalization hole 1164, equalization channel 1182, and equalization port(s) 1184 of the equalization pathway and/or the sizes of the depressurization channel 1142 and depressurization port 1148 of the depressurization pathway can affect the speed at which the seat assembly 260 moves between the closed and open orientations, and therefore the sizes can be selected to increase or decrease the speed at which the irrigation valve 1000 opens and closes, as desired.

Figure 12:
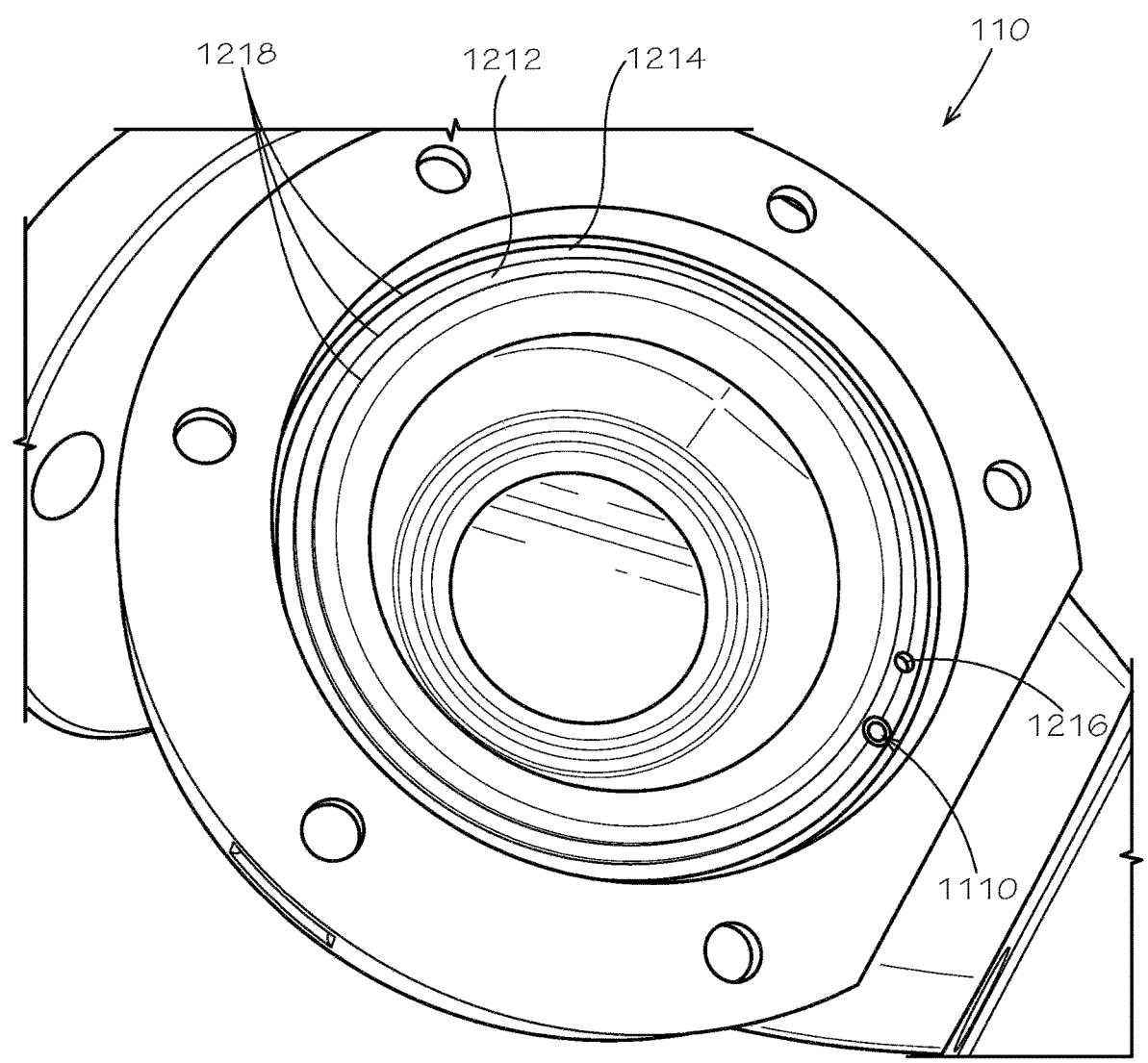
FIG. 12 illustrates the valve body according to another example aspect of the present disclosure.

FIG. 12 illustrates a top perspective view of the valve body 110 of the valve (e.g., the irrigation valve 1000, shown in FIG. 10) according to another example aspect of the present disclosure. According to example aspects, the valve body 110 can define an annular valve body slot surface 1212 defining a lower boundary 1214 of the annular slot 212 (shown in FIG. 2) defined between the valve body 110 and the bonnet 140 (shown in FIG. 1). In the present aspect, the valve body 110 can define a locator recess 1216 formed in the valve body slot surface 1212, as shown. The locator recess 1216 can be configured to receive a locator projection 1466 (shown in FIG. 14) of the diaphragm 262 (shown in FIG. 2), as described in further detail below. Each of the locator recess 1216 and locator projection 1466 can define a substantially circular cross-section in the present aspect; however, other aspects of the locator recess 1216 and locator projection 1466 can define any other suitable cross-sectional shape. In example aspects, the locator recess 1216 can be oriented proximate to the valve body channel 1110, as shown, though in other aspects, the locator recess 1216 may be formed elsewhere in the valve body slot surface 1212. Furthermore, according to some example aspects, the valve body slot surface 1212 can define one or more annular valve body grooves 1218 formed therein. For example, in the present aspect, the valve body slot surface 1212 can define three of the annular valve body grooves 1218, each of which can define a substantially V-shaped cross-section (the V-shaped cross-section is visible in FIG. 13). In other aspects, the valve body groove(s) 1218 can define any other suitable cross-sectional shape. Moreover, in other aspects, the valve body groove(s) 1218 may not be annular. Example aspects of the valve body grooves 1218 can be configured to aid in securing the diaphragm flange 274 (shown in FIG. 2) of the diaphragm 262 within the annular slot 212, as described in further detail below.

Figure 13:
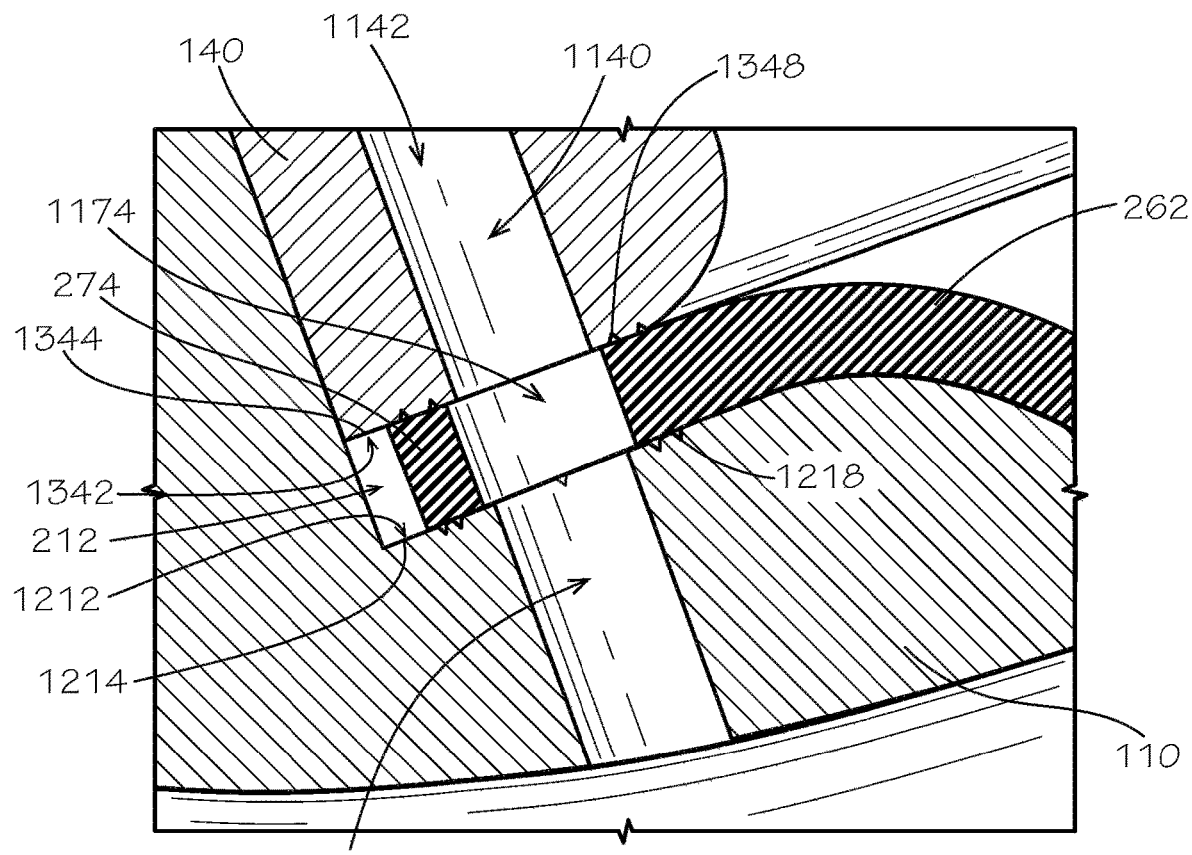
FIG. 13 is a detail cross-sectional view of the irrigation valve comprising the valve body of FIG. 12.

FIG. 13 illustrates a detail cross-sectional view of the diaphragm flange 274 clamped within the annular slot 212 formed between the valve body 110 and the bonnet 140. As shown, the valve body slot surface 1212 can define the lower boundary 1214 of the annular slot 212, and a bonnet slot surface 1342 of the bonnet 140 can define an upper boundary 1344 of the annular slot 212. The annular valve body grooves 1218 can be formed in the valve body slot surface 1212, and in the present aspect, the bonnet 140 can define annular bonnet grooves 1348 formed in the bonnet slot surface 1342. According to example aspects, the bonnet grooves 1348 can define a V-shaped cross-section, similar to the valve body grooves 1218. In other aspects, however, the bonnet grooves 1348 can define any other suitable cross-sectional shape. Furthermore, in other aspects, the bonnet grooves 1348 may not be annular. As shown, the diaphragm flange 274 of the diaphragm 262 can be received within the annular slot 212 and can be compressed between the valve body slot surface 1212 and bonnet slot surface 1342. The compression of the diaphragm flange 274 between the opposing valve body slot surface 1212 and bonnet slot surface 1342 can force portions of the diaphragm flange 274 into the V-shaped valve body grooves 1218 and V-shaped bonnet grooves 1348, which can improve the grip of the valve body and bonnet slot surfaces 1212,1342 on the diaphragm flange 274 to aid in retaining the diaphragm flange 274 within the annular slot 212.

Figure 14:
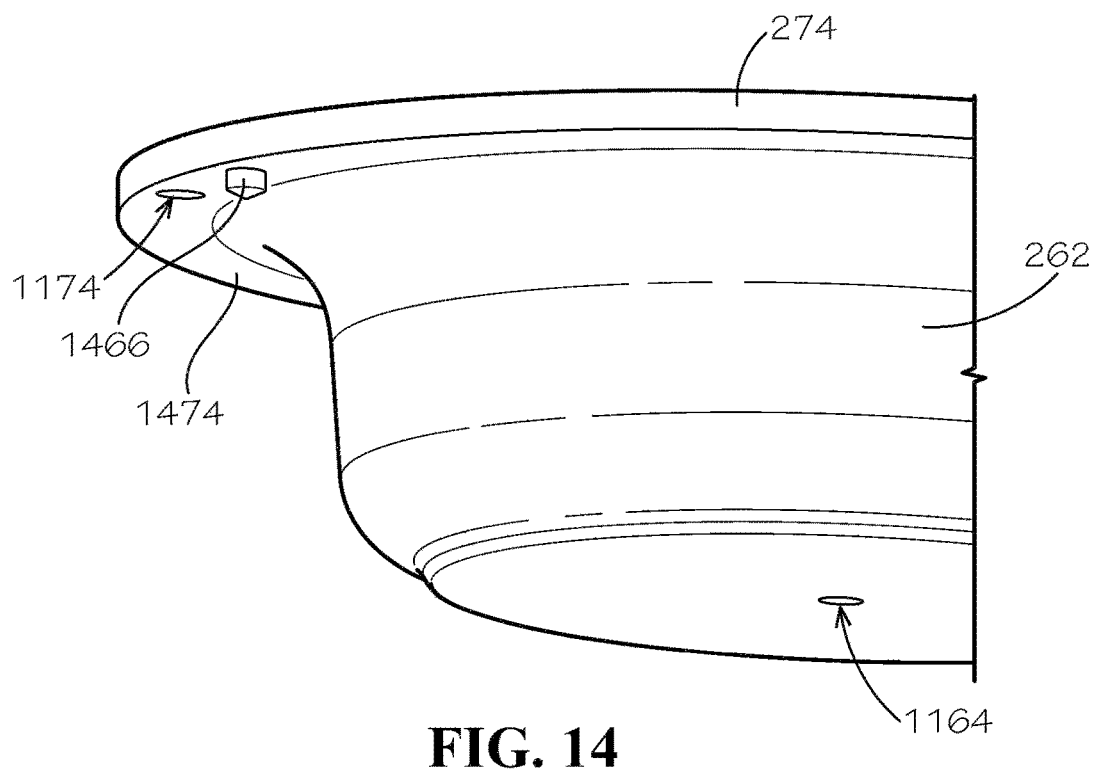
FIG. 14 illustrates the diaphragm according to another example aspect of the present disclosure.

FIG. 14 illustrates the diaphragm 262 according to another example aspect of the present disclosure. As shown, example aspects of the diaphragm flange 274 can define the locator projection 1466 extending from an outer diaphragm flange surface 1474 thereof. In the present aspect, the locator projection 1466 can be oriented proximate to the flange opening 1174; however, in other aspects, the locator projection 1466 can extend elsewhere from the outer diaphragm flange surface 1474. According to example aspects, the locator projection 1466 can be configured to engage the locator recess 1216 (shown in FIG. 12) of the valve body 110 (shown in FIG. 12) in order to properly align the flange opening 1174 (shown in FIG. 13) with the bonnet channel 1140 (shown in FIG. 13) and the valve body channel 1110 (shown in FIG. 13) to define the depressurization channel 1142 (shown in FIG. 13).

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A seat assembly for a valve, the seat assembly comprising:
   a valve body defining a pair of ports, the valve body comprising:
      a valve body step defining a recessed valve body sealing surface; and
      an annular diaphragm support flange comprising a rounded support surface;
   a diaphragm defining a first diaphragm end supported by the annular diaphragm support flange, the diaphragm comprising an annular diaphragm step extending about the recessed valve body sealing surface to form a seal at a second diaphragm end in a closed orientation, the diaphragm comprising:
      a diaphragm end wall at the second diaphragm end, the diaphragm end wall defining an inner diaphragm end wall surface and an outer diaphragm end wall surface, the outer diaphragm end wall surface defining the annular diaphragm step between the inner diaphragm end wall surface and the outer diaphragm end wall surface, a head pad extending from the annular diaphragm step to the outer diaphragm end wall surface engaging the recessed valve body sealing surface in the closed orientation; and
      a diaphragm sidewall coupled to the diaphragm end wall and extending from the first diaphragm end to the second diaphragm end, the diaphragm sidewall defining the annular diaphragm step between a diaphragm sealing surface of the outer diaphragm end wall surface and the diaphragm sidewall; and
   a diaphragm guide comprising:
      a guide disc defining an inner guide disc surface and an outer guide disc surface, the outer guide disc surface abutting the inner diaphragm end wall surface; and
      a guide stem monolithically formed with the guide disc.

2. The seat assembly of claim 1, wherein the seat assembly defines a seat assembly axis through a center of the guide disc and extends from the guide disc axially along the seat assembly axis.

3. The seat assembly of claim 1, the diaphragm further comprising a diaphragm flange extending radially outward from the diaphragm sidewall at the first diaphragm end.

4. The seat assembly of claim 1, wherein the diaphragm comprises a resilient material and the diaphragm guide comprises a rigid material.

5. The seat assembly of claim 1, wherein the guide disc is attached to the diaphragm end wall by a fastener.

6. The seat assembly of claim 1, wherein the diaphragm guide further comprises a guide sidewall extending from an outer periphery of the guide disc.

7. The seat assembly of claim 1, wherein the guide disc defines an annular inner disc lip extending from the inner guide disc surface and an annular outer disc lip.

8. The seat assembly of claim 7, wherein an annular disc groove is defined between the annular inner disc lip and the annular outer disc lip.

9. A valve comprising:
   a valve body defining an inlet cavity region and an outlet cavity region, the valve body comprising:
      a valve body step defining a recessed valve body sealing surface; and
      a diaphragm support flange comprising a rounded support surface;
   a bonnet coupled to the valve body; and
   a seat assembly configured to move between an open orientation and a closed orientation, comprising:
      a diaphragm defining a diaphragm end wall at a second diaphragm end comprising a head pad extending from an inner end wall surface and an outer end wall surface and defining a diaphragm step opposite the valve body step defined between the inner end wall surface and the outer end wall surface, an annular diaphragm flange at a first diaphragm end retained between the bonnet and the valve body and supported the diaphragm support flange, and a diaphragm sidewall coupled to the diaphragm end wall and extending from the first diaphragm end to the second diaphragm end, the diaphragm sidewall defining the annular diaphragm step between a diaphragm sealing surface of the outer diaphragm end wall surface and the diaphragm sidewall;
      a diaphragm guide defining a guide disc abutting the diaphragm end wall; and
      a spring biasing the seat assembly to the closed orientation, a first spring end of the spring secured to the guide disc by engagement of the first spring end with a disc groove of the guide disc;
   wherein in the open orientation, fluid is permitted to flow between the inlet cavity region and the outlet cavity region; and
   wherein in the closed orientation, the head pad, comprising the outer end wall surface and the diaphragm step, engages the annular support flange of the valve body step, and fluid is prohibited from flowing between the inlet cavity region and the outlet cavity region.

10. The valve of claim 9, wherein:
   the valve body further defines a valve body groove;
   the bonnet defines a bonnet groove; and
   the annular diaphragm flange is configured to be received within the bonnet groove and the valve body groove.

11. The valve of claim 9, wherein:
the bonnet and the valve body define an upper chamber; and
the valve further comprises a control system configured to adjust pressure in the upper chamber.

12. The valve of claim 9, wherein:
the diaphragm guide further comprises a guide stem extending from the guide disc;
the bonnet comprises a bonnet post defining a bonnet bore; and
the guide stem slidably engages the bonnet bore and is configured for linear movement within the bonnet bore.

13. The valve of claim 12, further comprising a guide bushing engaged with the bonnet post, the guide bushing defining a bushing bore, the guide stem slidably engaging the bushing bore.

14. The valve of claim 13, wherein:
the guide bushing defines an outer bushing surface;
the outer bushing surface defines bushing threading;
the bonnet post defines an inner sidewall surface;
the inner sidewall surface defines bonnet threading; and
the bushing threading of the guide bushing is configured to mate with the bonnet threading of the bonnet.

15. A method for opening a valve comprising:
providing the valve of claim 9;
decreasing pressure in an upper chamber defined by the bonnet and the valve body;
detecting a first pressure at a port within the inlet cavity region and a second pressure at a port in the outlet cavity region, and
disengaging the head pad from the valve body step of the valve to allow fluid flow from the inlet cavity region to the outlet cavity region.

16. The method of claim 15, wherein decreasing pressure in the upper chamber comprises operating a control system to release fluid from the upper chamber.

17. The method of claim 15, wherein:
the valve further comprises a guide bushing engaged with a bonnet bore; and
sliding a guide stem of the diaphragm guide within the bonnet bore of the valve comprises sliding the guide stem linearly along the guide bushing.

18. The method of claim 15, further comprising closing the valve by engaging the head pad of the diaphragm, comprising the outer wall and the diaphragm step, against the valve body step to block fluid flow from the inlet cavity region to the outlet cavity region.

19. A valve comprising:
a valve body defining a pair of ports and comprising a valve body step defining a recessed valve body sealing surface, a diaphragm support flange comprising a rounded support surface, an inlet cavity region, and an outlet cavity region;
a bonnet coupled to the valve body and defining an upper chamber, the bonnet defining a bonnet bore;
a seat assembly movable between an open orientation and a closed orientation and defining an equalization pathway extending from the inlet cavity region to the upper chamber, comprising:
a diaphragm supported by the diaphragm support flange and a diaphragm guide, the diaphragm guide defining a guide disc and a guide stem; and
a diaphragm end wall at a second diaphragm end comprising a head pad extending from an inner wall to an outer wall and defining a diaphragm step between the inner wall and the outer wall and opposite the valve body step, the guide disc abutting the diaphragm end wall, the guide stem configured to slide through the bonnet bore,
a diaphragm sidewall coupled to the diaphragm end wall and extending from a first diaphragm end to the second diaphragm end, the diaphragm sidewall defining the diaphragm step between a diaphragm sealing surface of the outer wall and the diaphragm sidewall;
a depressurization pathway extending from the upper chamber to the outlet cavity region; and
a solenoid system comprising a plunger, the plunger movable between a closed position, wherein the depressurization pathway is sealed by abutment of the plunger with an inlet channel of the depressurization channel, which causes engagement of the head pad and diaphragm step of the diaphragm to the recessed valve body sealing surface and the valve body step of the valve body, and an open position, wherein the depressurization pathway is unsealed.

20. The valve of claim 19, wherein the equalization pathway comprises an equalization hole formed through the diaphragm and an equalization passage formed through the diaphragm guide.

21. The valve of claim 19, wherein the depressurization pathway comprises a depressurization port formed through the bonnet and a depressurization channel formed through the bonnet, the diaphragm, and the valve body.

22. The valve of claim 19, wherein the solenoid system further comprises a solenoid and a spring, the spring biasing the plunger to the closed position and the solenoid configured to generate a magnetic field to move the plunger to the open position.

23. The valve of claim 19, wherein an equalization passage begins at a surface of the diaphragm end wall facing the guide disc.

24. The valve of claim 19, wherein an equalization passage defines one or more equalization ports formed in the diaphragm guide, the one or more equalization ports extending from the equalization passage to the upper chamber.

* * * * *